(12) United States Patent
Zhang et al.

(10) Patent No.: US 6,516,414 B1
(45) Date of Patent: Feb. 4, 2003

(54) SECURE COMMUNICATION OVER A LINK

(75) Inventors: Minda Zhang, Mesa, AZ (US); Richard J. Takahashi, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/258,359

(22) Filed: Feb. 26, 1999

(51) Int. Cl.$^7$ .................................................. G06F 1/24

(52) U.S. Cl. ........................ 713/176; 713/168; 713/170; 713/180; 713/200

(58) Field of Search ................................ 713/168, 170, 713/176–180, 182, 200, 201

(56) References Cited

U.S. PATENT DOCUMENTS

| | | | |
|---|---|---|---|
| 4,712,238 A | | 12/1987 | Gilhousen et al. |
| 5,796,829 A | | 8/1998 | Newby et al. |
| 5,943,426 A | * | 8/1999 | Frith et al. .................. 713/153 |
| 6,021,491 A | * | 2/2000 | Renaud ....................... 713/179 |
| 6,023,509 A | * | 2/2000 | Herbert et al. ................. 380/29 |

FOREIGN PATENT DOCUMENTS

| | | |
|---|---|---|
| WO | WO 97/38530 | 10/1997 |
| WO | WO 98/56179 | 12/1998 |

OTHER PUBLICATIONS

Schneier, "Applied Cryptography", 1995, Wiley & Sons, Inc., second edition, p. 39, section "Algorithms and Terminology".*
Bruce Schneier, *Applied Cryptography*, John Wiley & Sons, Inc., pp. 28–41, 44–46, 429–431, 442–445, 461–466, 476–479, 483–495, 513–516, 532–533, (1996).
Digital Video Broadcasting, *DVB Shows Conditional Access Common Sense*, pp. 1, printed from web site http://www.d-vb.org/dvb_news/dvb_pr025.htm, dated at least as early as Dec. 30, 1998.
Jim Barthold, *The Next Digital Transition? A Move To Open Cable, CableLabs Push Making Progress, But It Won't Show Up At The Western Show*, pp. 1–3, printed from web site http://www.mediacentral.com/MagazineWorld/News97/1997112413.htm/539128, dated as early as Dec. 8, 1998.
Paragon Cable, *Cable Modem FAQ*, pp. 1–7, printed from web site http:/www.paragonpdx.com/cablemod.html, dated as early as Dec. 8, 1998.
Electronic Privacy Information Center, *Digital Signatures*, pp. 1–2, printed from web site http://www.epic.org/crypto/dss, dated as early as Jan. 14, 1999.
Charlotte Adams, *NIST Initiative Will Shine Spotlight On Elliptic Curve*, pp. 1–3, printed from web site http://www-.fcw.com/pubs/fcw/1997/0609/few–curve–6–9–1997.html, (Jun. 9, 1997).
Electronic Privacy Information Center, *CSL Bulletin*, pp. 1–6, printed from web site http://www.epic.org/crypto/dss/nist_dss_bulletin.html, (Jan. 1993).
*Digital Signature Standard, Fact Sheet On Digital Signature Standard*, pp. 1–5, (May 1994).
Office of Telecommunications, *The Pricing Of Conditional Access Services For Digital Television*, pp. 1–31, (Oct. 1997).
Schneier: *Applied Cryptography*, 1996, Wiley & Sons, Ney York XP002138607 pp. 56–63.

* cited by examiner

Primary Examiner—Thomas R. Peeso
(74) Attorney, Agent, or Firm—Trop, Pruner & Hu, P.C.

(57) ABSTRACT

A method and apparatus of protecting communications in a receiver having a first and a second module includes issuing a request to a transmitter. The identities of the first and second modules are verified based on information in the request. The transmitter transmits a predetermined message to the receiver after verification. The first and second devices are authenticated based on the predetermined message.

25 Claims, 8 Drawing Sheets

SECURE COMMUNICATION OVER A LINK

BACKGROUND

The invention relates to secure communication over a link.

Television programming and associated data may be broadcast over a number of different transport media, which may include cable networks, digital satellite television links, and other wired or wireless links. Paid television broadcasts, in which consumers pay for specific programs or channels that they would like to view (e.g., movie channels, pay-per-view programs, etc.), have become increasingly popular. To provide pay television services, conditional access systems have been used by broadcasters to enable viewing of such paid television broadcasts by authorized viewers.

In conditional access systems, broadcast programming content is typically encrypted according to some conditional access cryptographic protocol. In addition, an authorization process typically is performed to enable receipt of encrypted content by authorized receivers. The authorization process may include sending instructions to each of a potentially large population of addressable receivers (such as those located in set-top boxes, for example).

Authorization may be performed by sending an authorization signal that is targeted, or addressed, to a receiver along with the encrypted content. The authorization signal enables the addressed receiver to decrypt the encrypted content according to a conditional access protocol so that a clean copy of the programming content may be produced for viewing.

However, the encrypted information transmitted in a conditional access system may be circumvented relatively easily by unauthorized descramblers. Such unauthorized access causes loss of revenue to service providers as well as degradation of transmitted signals due to extra unexpected loading. Thus a need exists for an improved protection scheme for broadcast signals or other transmitted information.

SUMMARY

In general, according to one embodiment, a method of protecting communications in a receiver having a first and a second module includes issuing a request to a transmitter. The identities of the first and second modules are verified based on information in the request. The transmitter transmits a predetermined message to the receiver after verification. The first and second devices are authenticated based on the predetermined message.

Other features and embodiments will become apparent from the following description and from the claims.

DETAILED DESCRIPTION

In the following description, numerous details are set forth to provide an understanding of the present invention. However, it is to be understood by those skilled in the art that the present invention may be practiced without these details and that numerous variations or modifications from the described embodiments may be possible.

In this description, the following terminology may be used. A message to be encrypted may be referred to as plaintext and an encrypted message may be referred to as ciphertext. The process of turning ciphertext back into plaintext may be referred to as decryption. The technique of keeping messages secure may be referred to as cryptography, and the technique of breaking ciphertext may be referred to as cryptanalysis. Thus, plaintext is encrypted to produce ciphertext, which is then decrypted to produce the original plaintext. A cryptographic algorithm, also referred to as a cipher, is a mathematical function or functions used for encryption and decryption. With some cryptographic algorithms, there may be two related functions: one for encryption and the other for decryption. Many types of cryptographic algorithms exists, including the public-key algorithms (also referred to as asymmetric algorithms) that are designed so that the key used for encryption is different from the key used for decryption. In systems implementing public-key algorithms, the encryption key may be referred to as the public key and the decryption key may be referred to as a private key (also referred to as a secret key). Other cryptographic algorithms include key-exchange algorithms, and algorithms that use one-way hash functions.

One cryptographic technique uses a session key to encrypt and decrypt communications. A session key is generally used for only one or a limited number of communication sessions and then discarded. Using separate keys for different communications make it less likely that the key may be compromised.

Figure 1A:
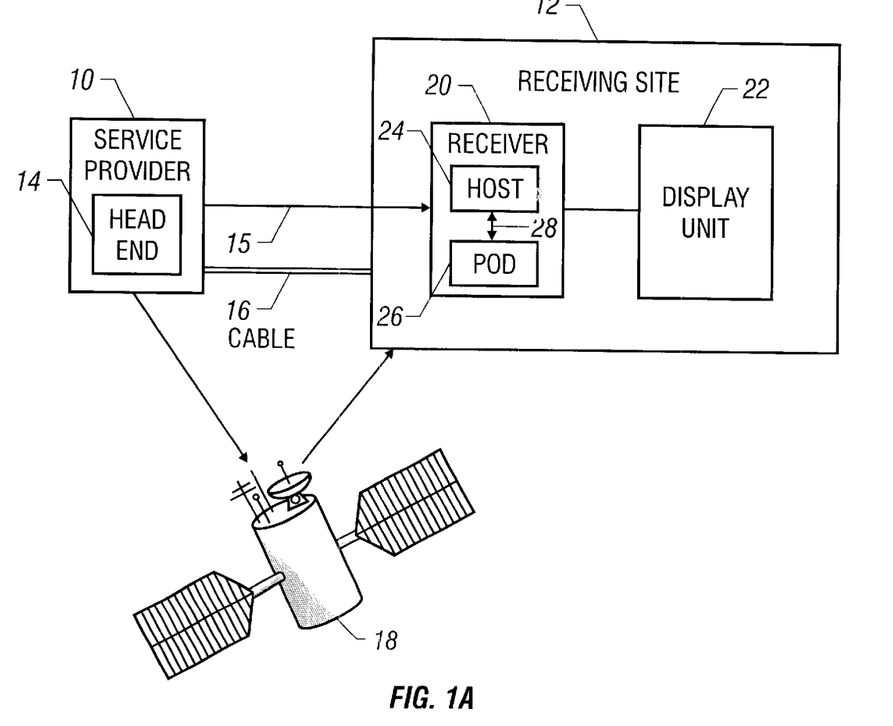
FIG. 1A is a block diagram of an embodiment of an information transmission system.

Referring to FIG. 1A, an information transmission system may be a broadcast system (e.g., television programming or other type of video broadcast system) that includes a service provider 10 and a number of receiving sites 12 (e.g., homes that receive TV programming). In other embodiments, the information transmission system may include other types of systems, such as a system including a network (e.g., local area network, wide area network, Internet, and so forth); a system for transmitting audio signals such as a telephone network or a cellular or other wireless communications network; or any other system in which information may need to be transmitted over communications channels. In the description that follows, reference is made to embodiments in which television programming or video content is transmitted to multiple receiving sites; however, it is to be understood that the invention is not to be limited in this respect, but may include others.

As illustrated in FIG. 1A, the service provider 10 may include a head-end system 14 that receives content to be transmitted (the plaintext) and applies an encryption algorithm according to some information protection protocol (e.g., a conditional access protocol) to produce encrypted information (the ciphertext). The encrypted information may be transmitted over a transport medium 15, such as a cable link 16, a satellite link 18, a telephone line, a terrestrial link, a wireless link, and so forth. The transmitted information is received by one or more receivers 20 located at corresponding receiving sites 12. Each receiver 20 is adapted to decrypt the received information according to a specified protection protocol, such as a conditional access protocol, to reproduce the original programming content (the plaintext) for display by one or more display units 22.

The receiver 20 may include a host device 24, which may be an integrated receiver device (IRD) such as a set-top box, that is coupled to a point-of-deployment (POD) module 26, such as a conditional access module (CAM). The POD module 26 may be an integrated circuit card (e.g., a smart card) or other electronics device that may be inserted into a slot of, or otherwise electrically coupled to, the host device 24. To protect information communicated between the POD module 26 and the host device 24, a copy or content protection (CP) protocol may be implemented, as described further below.

The POD module 26 in the receiver 20 may be preprogrammed to decrypt certain types of transmitted information (including content encrypted according to a conditional access protocol) and to decode authorization messages, if any, transmitted by the service provider 10. Other types of host devices 24 may include a television, a video cassette recorder (VCR), a personal computer, or other devices that have integrated receivers to receive information from the head-end system 14.

The encrypted information transmitted by the head-end system 14 over the link 15 is received by the POD module 26 in the receiver 20. Based on whether the particular receiver 20 has been authorized to descramble the received information (based on an authorization message, for example), the POD module 26 may decrypt the received signal to produce plaintext. An authorization message may be sent by the head-end system 14 to the receiver 20, for example, in response to a user request to view a particular program or channel at a receiving site 12.

To protect information according to some embodiments of the invention, a copy or content protection (CP) scheme may be employed in the receiver 20 to prevent or reduce the likelihood that an unauthorized user can gain access to the information transmission system. To prevent unauthorized access, a content protection scheme utilizes a cryptographic protocol to protect information transmitted over the link 28 between the POD module 26 and the host device 24 in the receiver 20. To verify identities of the POD module 26 and host device 24, entity authentication is performed between the POD module 26 and the host device 24 based on special binding messages transmitted by the head-end system 14. In addition, using such messages from the head-end system 14, the POD module 26 and the host device 24 can generate a session key for encrypting and decrypting messages transmitted between the POD module 26 and host device 24. Effectively, the content protection scheme bridges or links an existing conditional access system (including the head-end system 14 and the POD module 26) to the copy protection system implemented in the receiver 20 (including the POD module 26 and host device 24).

Thus, according to an embodiment, to enable authentication between the POD module 26 and the host device 24, a third entity is involved, in this case the head-end system 14. The head-end system 14 may store one or more databases containing information from which the special binding messages are generated for the devices 24 and 26. The binding messages may be generated by the head-end system 14 in response to a request from the receiver 20 for a conditional access-content protection binding service (which includes performing entity authentication and session key derivation). A random counting mechanism may also be embedded in the authentication process to make it more robust against a "man-in-the-middle" and a replay attack in which messages transmitted between the POD module 26 and the host device 24 may be monitored by an intruder to break the cipher of the content protection scheme utilized in the receiver 20. Once entity authentication has been performed to ensure that the POD module 26 and the host device 24 are both verified units, a shared session key may then be derived to protect messages between the POD module 26 and host device 24.

The content protection system according to some embodiments utilizes one of many available cryptographic protocols that allow a relatively low cost implementation. Cryptographic protocols that may be used include a public-key algorithm (e.g., the ElGamal message authentication code); a one-way hash function algorithm (e.g., a secure hash algorithm such as SHA-1); and a key exchange algorithm (e.g., the Diffie-Hellman algorithm). Other types of cryptographic protocols may also be used, such as the Rivest-Shamir-Adleman (RSA) algorithm (a public-key algorithm); the Digital Signature Algorithm (a public-key algorithm); a message digest algorithm such as MD4 or MD5 (one-way hash functions); and other algorithms. The listed algorithms along with many other types of cryptographic algorithms that may be used in some embodiments of the invention are described in Bruce Schneier, "Applied Cryptography," John Wiley & Sons, Inc. (2d., 1996).

Figure 2:
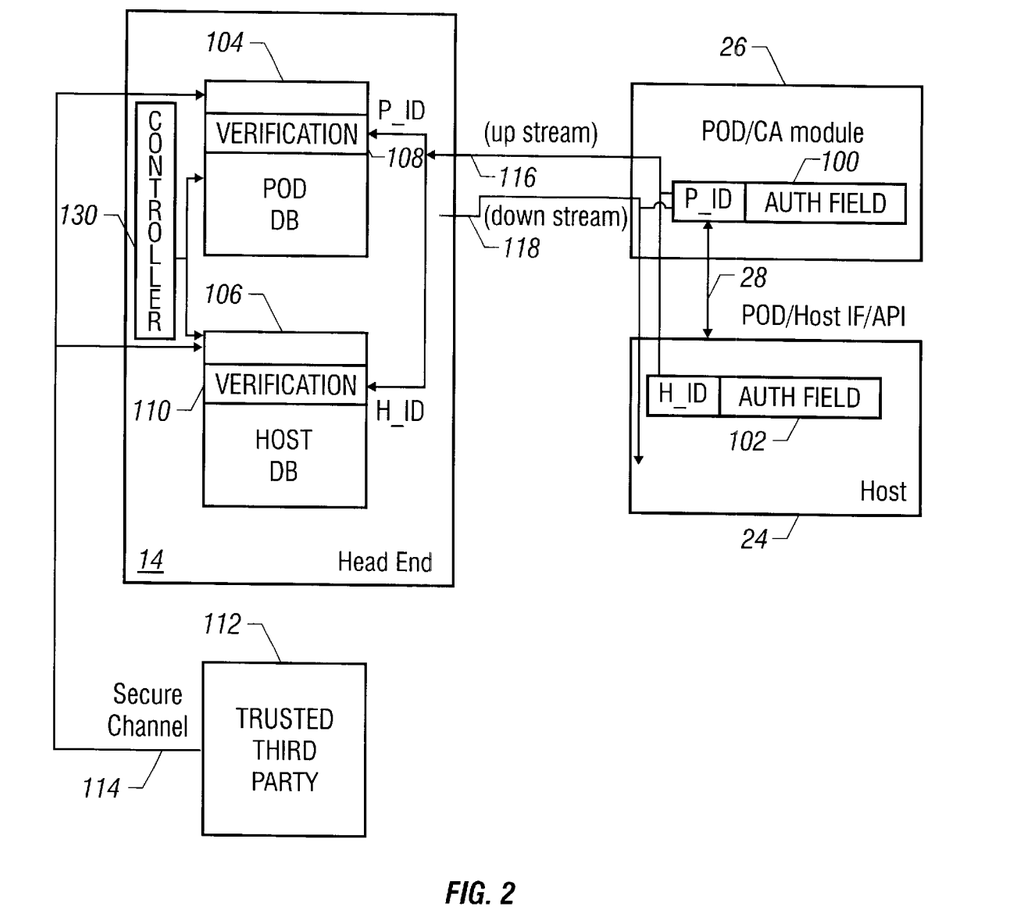
FIG. 2 illustrates communications paths and stored information in the system of FIG. 1A.

Referring to FIG. 2, the entity authentication process utilized by some embodiments of the invention employs a trusted third party 112 that is able to pass either the public or secret keys of the one or more host devices 24 and POD modules 26 at one or more receiving sites 12 to the head-end system 14 over a secure channel 114. As examples, such a trusted third party may be Cable Television Laboratories Inc. (CableLabs) or some other multiple system operator (MSO). The trusted third party 112 generates a list or lists of public or private keys (and/or other verification information) that are associated by device identifiers (e.g., serial numbers) of the POD modules 26 and host devices 24. The list or lists may be communicated to the head-end system 14 over a secure channel 114. From the lists, the head-end system 14 may generate one or more databases that are stored in storage media in the head-end system. For example, in the illustrated embodiment, the head-end system 14 includes a database 104 to store verification information associated with POD modules 26 and a database 106 to store verification information associated with host devices 24. The one or more databases are accessed by the head-end system 14 to generate binding messages for a host device 24 and a POD module 26, and in some embodiments, to verify identities of the host device and POD module during the entity authorization process. Once entity authentication has been performed, the POD module 26 and host device 24 may further generate session keys (which may also be based on the binding messages sent by the head-end system) to protect communications with each other.

In this description, the information transmission system may also be referred to as a conditional access/content protection (CA-CP) system. The CA-CP system according to an embodiment may include a number of components, including the head-end system 14 that is part of a conditional access system that sets up and encrypts content for transmission over the transport medium 15. The head-end system 14 also stores one or more databases (e.g., 104 and 106) containing verification information of the devices 24 and 26. Another component of the CA-CP system is the transport medium 15 to allow two-way communication (over an upstream path 116 and a downstream path 118) between the head-end system 14 and the receiver 20. On the two-way communications link 15, the receiver 20 can request that the head-end system 14 provide a CA-CP binding service according to an embodiment to allow the devices 24 and 26 to perform entity authentication. Downstream communication over the path 118 from the head-end system 14 to the receiver 20 includes protected content transmitted under a conditional access protocol as well as messages that are generated as part of the CA-CP binding service.

After entity authentication and session key derivation have been performed, the POD module 26 can decrypt ciphertext received from the head-end system 14 according to a CA protocol to produce a clean copy of the transmitted content. The POD module 26 next encrypts the clean content using a session key derived according to the CP protocol before transmission to the host device 24, which decrypts the transmitted information using the session key stored in the host device 24. The interface between the host device 24 and the POD module 26 may be an open application programming interface (API).

Figure 3A:
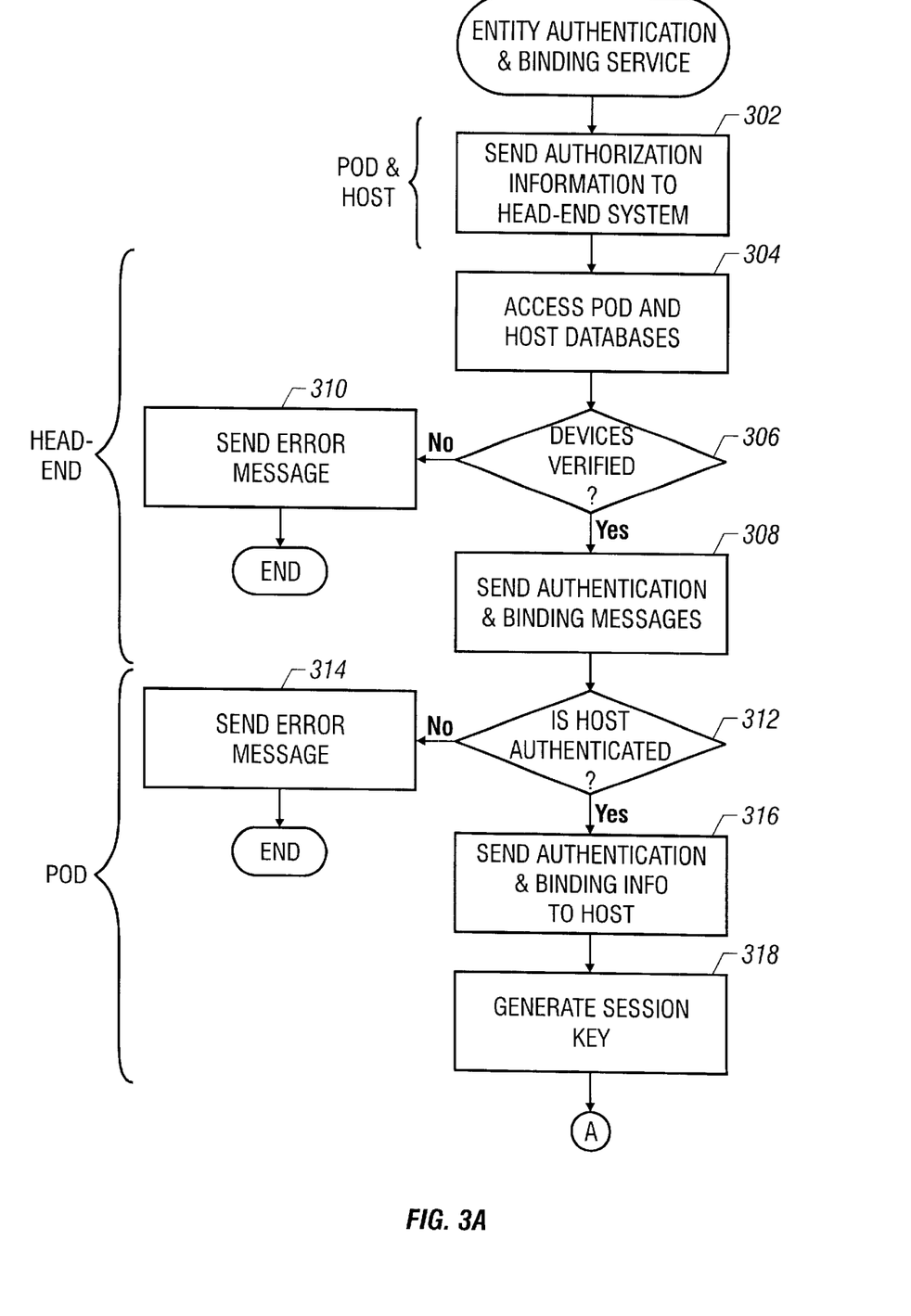
FIGS. 3A–3B are a flow diagram of a process according to an embodiment of protecting communication in the system of FIG. 1A.
Figure 3B:
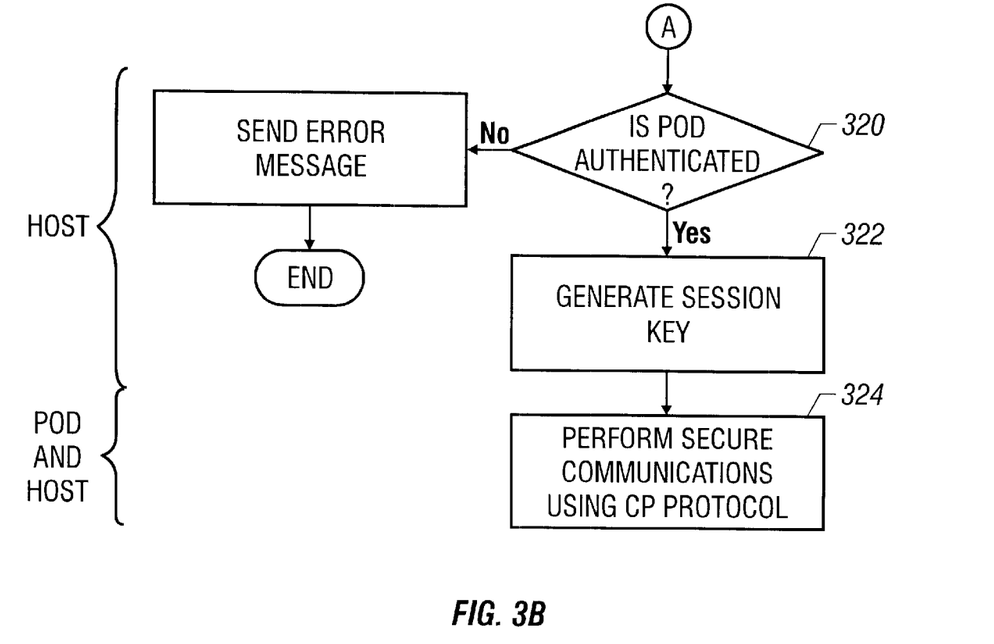

Referring further to FIG. 3, the process of performing the entity authentication and session key derivation (also referred to as a binding service) is illustrated. The receiver 20 transmits (at 302) authorization fields (or portions of authorization fields) of both the host device 24 and the POD module 26 over the upstream path 116 of the transport medium 15 to the head-end system 14. A POD authorization field 100 in the POD module 26 may include the device identifier P_ID of the POD module 26 along with other information (as described below), and a host authorization field 102 in the host device 24 may include the device identifier H_ID of the host 24 along with other information. The authorization fields 100 and 102 (or portions of such authorization fields) transmitted to the head-end system 14 effectively provide a request to the head-end system to perform a binding service (including entity authentication and session key derivation). In other embodiments, a separate message or a predefined flag or other indication may constitute a request to start a binding service.

A controller 130 in the head-end system 14 uses the device identifiers P_ID and H_ID in the received authentication field portions to map into corresponding locations in the databases 104 and 106, respectively (at 304). In one embodiment, the controller 130 may be implemented as a combination of hardware and software. The hardware may include, for example, a processor such as a microprocessor, microcontroller, a finite state machine implemented as an application specific integrated circuit (ASIC) or a programmable gate array (PGA), and the like. The hardware may also include one or more storage elements. Software in the head-end system 14 may include one or more routines to perform conditional access operations as well as generation of binding messages in response to requests from one or more receivers 20.

The identifier P_ID maps into a location 108 in the POD database 104, and H_ID maps into a location 110 in host database 106. Verification information stored in locations 108 and 110 of the POD database 104 and host database 106, respectively, may include one or more of the following items associated with the POD module 26 and the host device 24: a private or secret key; a public key; a predetermined signature; or other verification information. The verification information stored in the POD and host databases 104 and 106 may be used by the head-end controller 130 to generate binding messages for the requesting receiver 20, and optionally, to confirm that the authorization fields actually originated from authorized devices 24 and 26. Verification may be performed simply by checking that verification information associated with the devices 24 and 26 of the requesting receiver 20 is stored in the databases 104 and 106. Alternatively, verification may be performed by comparing contents of the received authorization field portions with verification information stored in locations 108 and 110 of the databases 104 and 106, respectively. If the head-end controller 130 is able to verify (at 306) the devices 24 and 26, the head-end system 14 next sends (at 308) binding messages over the downstream path 118 of the transport medium 15 to the POD module 26. If the head-end system 14 is unable to verify the at least one device 24 or 26 of a requesting receiver 20, then a predetermined error message may be sent (at 310).

From the binding messages sent by the head-end system 14, the POD module 26 determines (at 312) if the host device 24 is an authorized device. If the authentication is successful, then the POD module 26 transmits (at 316) binding information to the host 24 and generates and stores (at 318) the session key to use in protection of communications between the POD module 26 and host device 24. However, if the POD module 26 is unable to authenticate the host device, then an error message may be generated (at 314).

In the host device 24, the received binding information is used to authenticate the POD module 26 (at 320). If authentication is unsuccessful, then an error message may be generated (at 322). However, if authentication is successful, then the host device 24 generates and stores (at 324) the session key to use to decrypt content received by the POD module 26. Using the independently derived session key stored separately in the POD module 26 and the host device 24, secure communications over the link 28 in the receiver 20 may be performed (at 324). The session keys are stored in secure storage elements in the host device 24 and POD module 26 that are tamper-resistant.

Thus, as described, the host device 24 and POD module 26 are able to authenticate each other based on binding messages transmitted by the head-end system 14 to the host device 24 and POD module 26. By using the binding process according to some embodiments of the invention, system integrity may be maintained by reducing the likelihood that the protection protocol used can be circumvented by unauthorized users and devices. In addition, the authentication may be performed independently of whatever conditional access mechanism may be utilized by the head-end system 14. Further, some embodiments of the invention allow a relatively low computation burden for the POD module 26 and the host device 24 during the binding process.

Figure 1B:
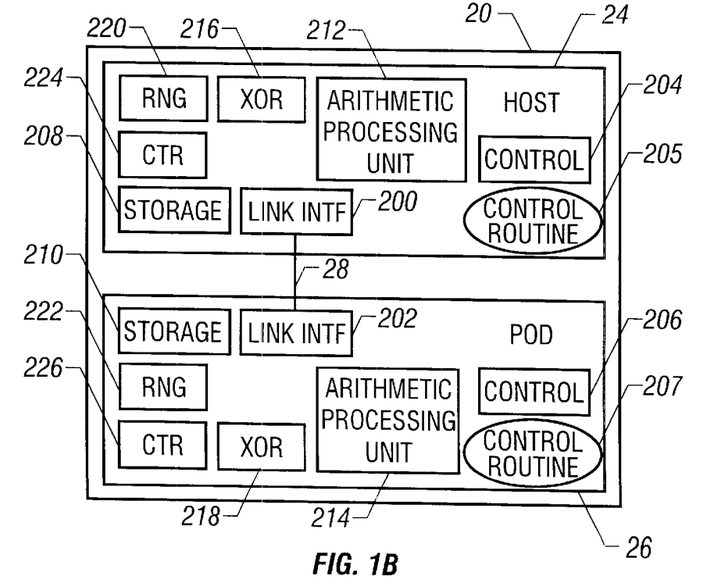
FIG. 1B is a block diagram of a receiver according to an embodiment in the system of FIG. 1A.

Referring to FIG. 1B, components and layers of the host device 24 and the POD module 26 are illustrated. Each of the host device 24 and POD module 26 includes a link interface 200 and 202, respectively, that are coupled to the link 28. In one example, the link interface 200 in the host device 24 may be coupled to a slot to receive the POD module 26, which may be an electronic card such as a smart card. The host device 24 and POD module 26 also include control devices 204 and 206, respectively, to control operations of the respective devices. Control routines 205 and 207 stored in respective storage elements may be executable on the control devices 204 and 206, respectively, to perform various tasks. In the POD module 26, the control routine 207 may perform decryption of conditional access ciphertext transmitted from the head-end system 14, entity authentication and session key derivation according to the binding service, and encryption of content according to a content protection protocol for transmission over the link 28. In the host device 24, the control routine 205 may perform entity authentication and session key derivation according to the binding service, decryption of content received over the link 28, and processing of the decrypted content (including for display and/or other manipulation).

Storage elements 208 and 210 are also included in the devices 24 and 26, respectively, to store such information as authorization fields, binding messages originating from the head-end system 14, transmitted content from the head-end system 14, software instructions and data, and so forth. The control devices 204 and 206 may be various types of control devices, including microprocessors, microcontrollers, ASICs, PGAs, and other programmable devices. The storage elements 208 and 210 may be one or more of various types of memories, such as dynamic random access memories (DRAMs), static random access memories (SRAMs), electrically erasable and programmable read only memories (EEPROMs), flash memories, and other types of memories such as hard disk drives, floppy disk drives, compact disc (CD) and digital video disc (DVD) drives.

To perform various cryptographic operations, the host device 24 and the POD module 26 may include the following units, respectively: arithmetic processing units 212 and 214; exclusive OR (XOR) units 216 and 218; random number generators 220 and 222; and counters 224 and 226. The units 212, 216, 220, and 224 in the host device 24 may be integrated into a single programmable.device, such as a control device 204, or implemented as discrete units. The units 214, 218, 222, and 226 in the POD module 26 may be similarly arranged. Such units may also be implemented in software, for example, as part of the control routines 205 and 207. Alternatively, tasks performed by the control routines 205 and 207 may be performed by hardware.

As sensitive information maybe kept in the storage elements 208 and 210 of the host device 24 and POD module 26, respectively, external access to those storage elements is prevented. Sensitive information may include the public and private keys or other information used in the binding process, as well as any derived session key for communications protected by a content protection protocol.

Figure 5:
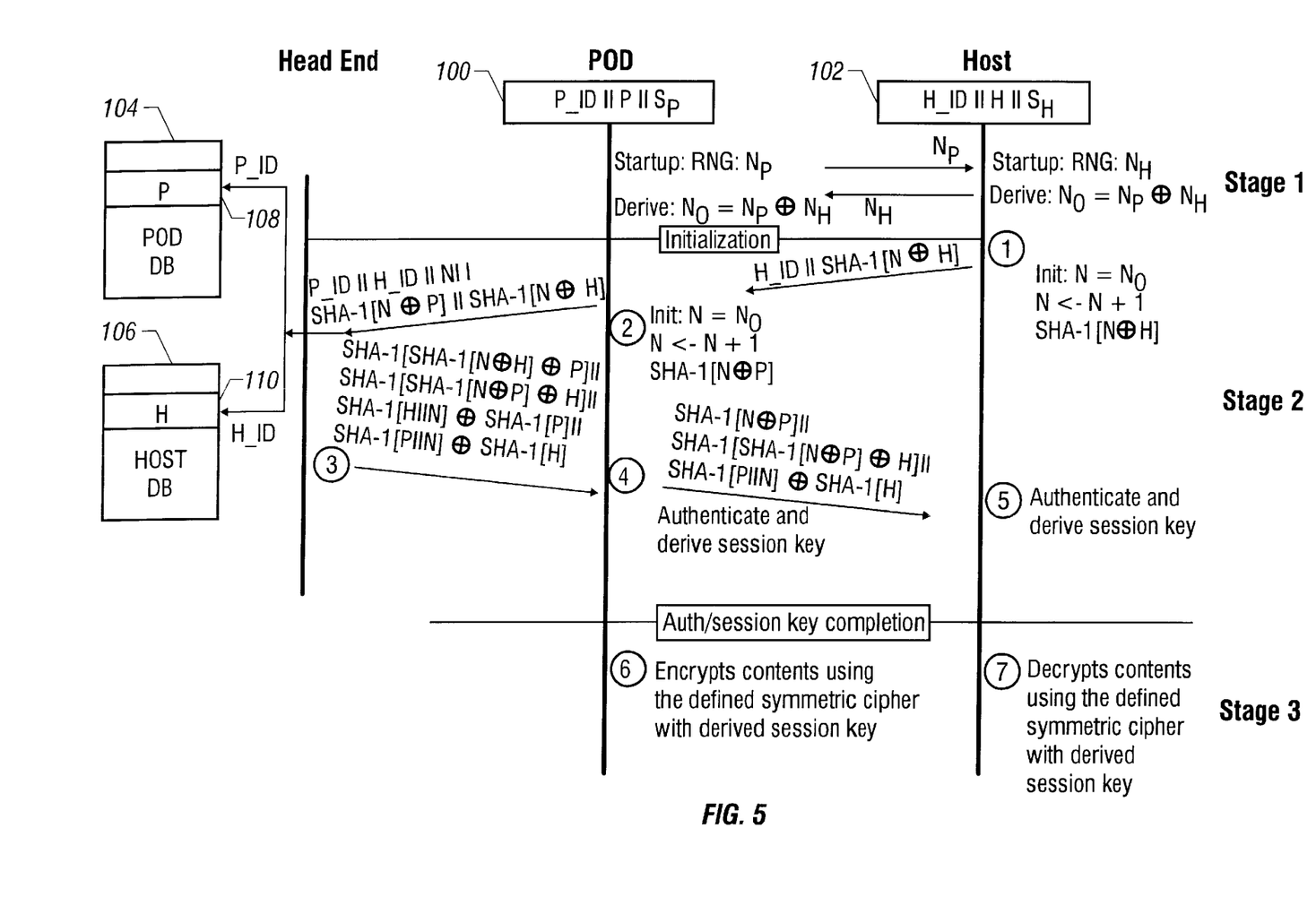
FIG. 5 is a state diagram of the process of FIGS. 3A–3B that utilizes a one-way hash function cryptographic protocol according to another embodiment.
Figure 6:
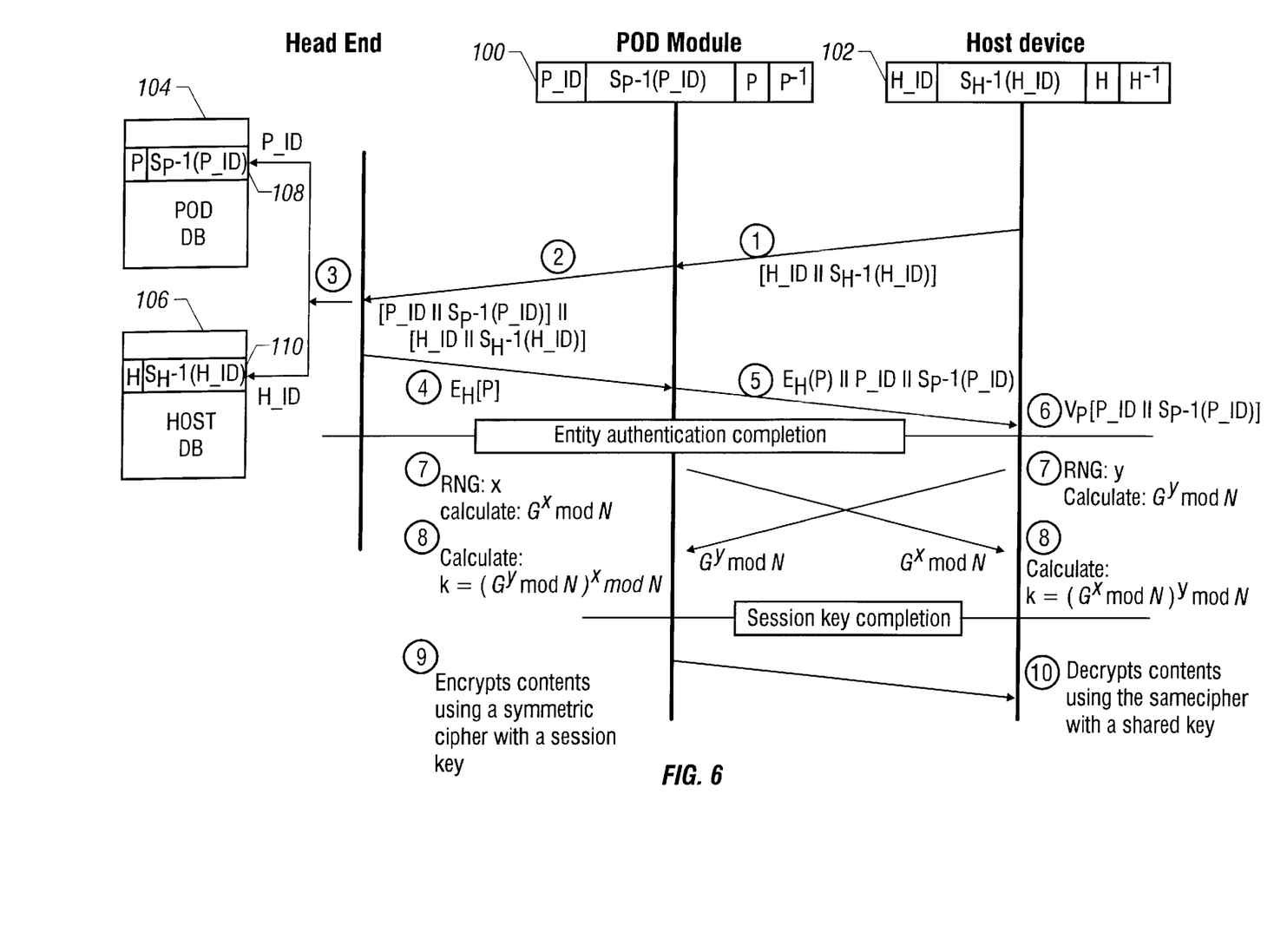
FIGS. 6 and 7 are state diagrams of the process of FIGS. 3A–3B according to further embodiments that utilize a digital signature protocol to perform entity authentication and a key exchange cryptographic protocol to derive session keys.
Figure 7:
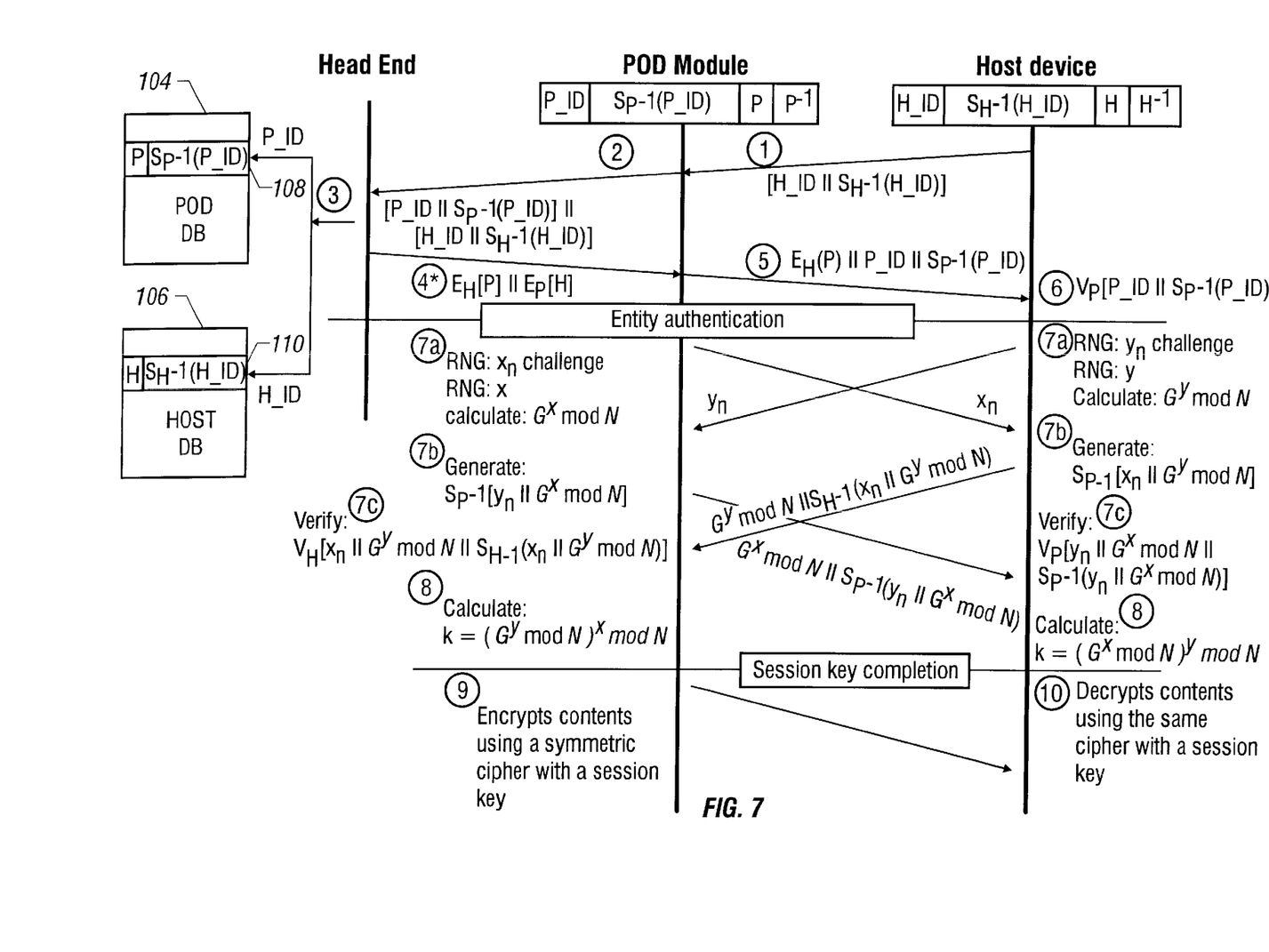

The following describes embodiments of information transmission systems that implement one of the following cryptographic algorithms for performance of the binding service: the ElGamal algorithm, which is a discrete logarithmic version of a public-key algorithm (FIG. 4); the SHA-1 algorithm, which is a one-way hash function algorithm (FIG. 5); and a combination of the Diffie-Hellman key exchange algorithm and digital signature algorithm (FIGS. 6–7). It is to be understood, however, that the invention is not to be limited to such described embodiments, as other types of cryptographic algorithms may also be implemented in further embodiments.

Figure 4:
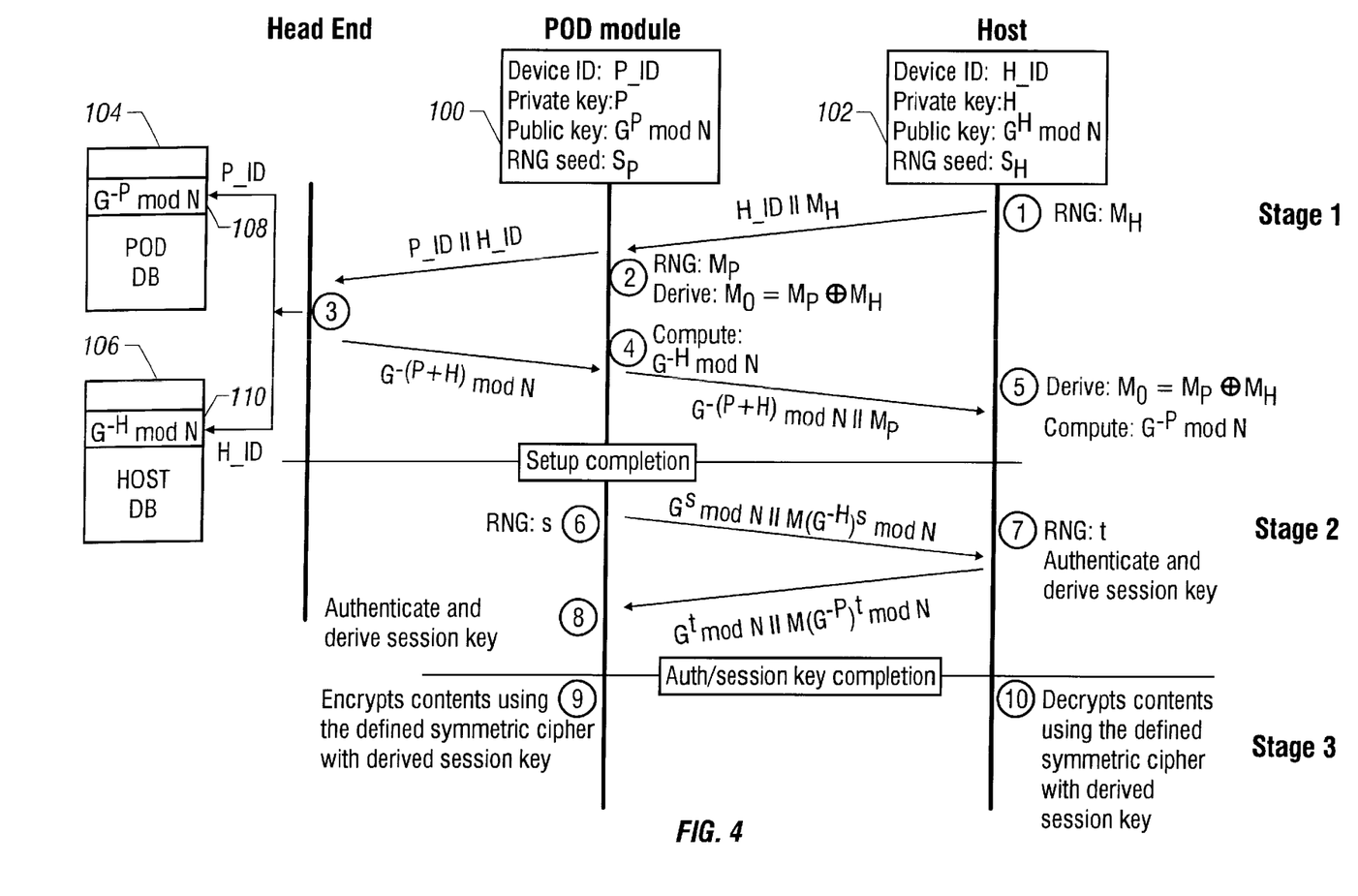
FIG. 4 is a state diagram of the process of FIGS. 3A–3B that utilizes a discrete logarithmic version of a public-key cryptographic protocol according to one embodiment.

Referring to FIG. 4, a state diagram is illustrated for a protection protocol according to one embodiment that implements the ElGamal algorithm to perform entity authentication and session key derivation. In the illustrated embodiment, three separate stages are included. In stage 1, setup of the content protection system including the POD module 26 and the host device 24 is performed. This may occur during initialization, such as when the POD module 26 is initially plugged into the host device 24 or when the host device 24 is power cycled. Five states are included in stage 1, in which messages are exchanged among the host device 24, the POD module 26, and the head-end system 14 to securely deliver information in the authorization fields of the host device 24 and the POD module 26 to the host device 24. In stage 2, entity authentication and session key derivation are performed. Three states (6, 7, and 8) are included in stage 2. Once stage 2 has been completed, communications between the POD module 26 and host device 24 may be protected according to a content protection protocol, which may include a cryptographic algorithm such as a symmetric cipher algorithm that utilizes a session key separately derived and stored in the devices 24 and 26.

As illustrated in FIG. 4, the authorization field stored in the storage element 208 of the host device 24 may include its device identifier (H_ID), its private key H, its public key $G^H \bmod N$, and a random number generator (RNG) seed $S_H$ (described below). The POD module 26 may store the following authorization field in its storage element 210: its device identifier P_ID, its private key P, its public key $G^P \bmod N$, and an RNG seed $S_P$. N is a predefined prime number, G is a predefined random number that serves as a generator, and mod N represents modulo N. In the head-end system 14, according to the illustrated embodiment, a reciprocal ($G^{-P} \bmod N$) of the POD module public key $G^{-P} \bmod N$ is stored as verification information in database 104, and a reciprocal ($G^{-H} \bmod N$) of the host public key $G^H \bmod N$ is stored as verification information in the database 106.

During the set up stage (stage 1), the host device 24 generates a random number $M_H$ in state 1 and transmits the following string $\{H\_ID \| M_H\}$ to the POD module 26 over the link 28. As used in this description, the term "A‖B" indicates concatenation of fields A and B in a stream. In state 2, the POD module 26 generates its random number $M_P$ and derives a common counter value $M_0$ which is an exclusive OR of $M_P$ and $M_H$:

$$M_0 = M_P \oplus M_H.$$

Next, the POD module 26 sends a stream containing concatenated device IDs $\{P\_ID \| H\_ID\}$, which are part of the authorization fields of the POD module 26 and host device 24, to the head-end system 14. The authorization field portions are indications to the head-end system 14 that a binding service has been requested. In state 3, based on the received values P_ID and H_ID, the head-end controller 130 accesses locations 108 and 110 in databases 104 and 106, respectively, to retrieve verification information $G^{-P} \bmod N$ and $G^{-H} \bmod N$. In state 3, the head-end controller 130 calculates the modulo multiplication of the retrieved values to obtain binding message $G^{-(P+H)} \bmod N$:

$$G^{-(P+H)} \bmod N = [G^{-P} \bmod N] [G^{-H} \bmod N] \bmod N.$$

The binding message is transmitted back to the POD module 26 over the link 15 between the head-end system 14 and the receiver 20. In state 4, the POD module 26 performs a modulo multiplication of the received value $G^{-(P+H)} \bmod N$ with its public key $G^P \bmod N$ to obtain $G^{-H} \bmod N$:

$$G^{-H} \bmod N = [G^{-(P+H)} \bmod N][G^P \bmod N] \bmod N.$$

The POD module 26 then forwards the binding message $G^{-(P+H)} \bmod N$ concatenated with the random number $M_P$, $\{G^{-(P+H)} \bmod N \| M_P\}$, to the host device 24 over the link 28.

Next, in state 5, the host device 24 also independently derives the common counter value $M_0$ by performing the exclusive OR of $M_P$ and $M_H$. In addition, the host device 24 computes $G^{-P}$ mod N by performing the modulo multiplication of the binding message transmitted by the head-end system 14 with the host device's public key:

$$G^{-P}\bmod N = [G^{-(P+H)}\bmod N][G^H \bmod N]\bmod N$$

States 1–5 complete the setup stage in which messages, including the device IDs of the host device 24 and POD module 26, random numbers $M_H$ and $M_P$, and the binding message have been exchanged among the host device 24, POD module 26, and head-end system 14.

After the setup stage, entity authentication and session key derivation are performed between the POD module 26 and host device 24 in stage 2. Once authenticated, the POD module 26 and the host device 24 are authorized to independently derive the session key according to the content protection scheme used in the receiver 20. In one embodiment, the derived session key may include a 1,024-bit entropy that is sufficient for 16 consecutive sessions to cipher content between the POD module 26 and the host device 24. In some embodiments, the content protection protocol performed in the receiver 20 utilizes a symmetric cryptographic algorithm that includes the session key.

In state 6, which is the first state of the authentication and session key derivation stage, a value M is initialized to the common counter value $M_0$. Next, M is updated by incrementing it by 1 (or by some other predetermined value):

$$M \leftarrow M+1.$$

In addition, the POD module 26 also encrypts M for the host device 24 using a modified ElGamal algorithm by generating a random integer s and computing $G^s \bmod N$ and $M(G^{-H})^s \bmod N$. The stream $\{G^s \bmod N \| M(G^{-H})^s \bmod N\}$ is sent from the POD module 26 to the host device 24.

Next, in state 7, the host device 24 initializes a variable M also to the common counter value $M_0$. Also, M is updated by incrementing it with 1 to synchronize it by the value M in the POD module 26. The host device 24 uses the modified ElGamal algorithm to encrypt M for the POD module 26 by first generating a random integer t, and then computing $G^t \bmod N$ as well as $M(G^{-P})^t \bmod N$. The host device 24 then sends the following stream $[G^t \bmod N \| M(G^{-P})^t \bmod N]$ to the POD module 26. Also in state 7, the host device 24 also decrypts the ciphertext sent by the POD module 26 to derive M' by performing a modulo multiplication as follows:

$$M'=\{[M(G^{-H})^s \bmod N]\cdot(G^s \bmod N)^H\} \bmod N.$$

If the parameter M' is equal to the parameter M, then the host device 24 has authenticated the POD module 26, and the host device 24 derives the shared key k which is calculated as follows:

$$k=(G^{ts} \bmod N)=[(G^s \bmod N)^t \bmod N].$$

Next, in state 8, the POD module 26 receives the ciphertext from the host device 24 and calculates a parameter M' by performing the following operation:

$$M'=\{[M(G^{-P})^t \bmod N]\cdot(G^t \bmod N)^P\}\bmod N.$$

Next, the value of M' is compared to the value of M, and if equal, the POD module 26 authenticates the host device 24 and derives a shared session key k as follows:

$$k=(G^{ts} \bmod N)=[(G^t \bmod N)^s \bmod N].$$

After completion of entity authentication and shared key derivation, the final key K is calculated from the session key k under modulo of the target cipher key size:

$$K=k\bmod(\text{cipher key size}).$$

This operation circulates the data field of k up to exhaust the entropy of k.

Upon establishing the shared session key K, the POD module 26 can now cipher the content transmitted over the link 28 in the receiver 20 according to the content protection protocol. The content protection protocol to protect content transmitted between the host device 24 and POD module 26 is performed in states 9 and 10 which are included in stage 3 of the state diagram of FIG. 4. Such content may include broadcast video and audio data.

According to one embodiment, in state 9, the POD module 26 decrypts a transported stream received from the head-end system 14 according to a conditional access protocol between the head-end system 14 and the POD module 26. Next, the POD module 26 encrypts the content from the head-end system 14 using the derived session key K according to a symmetric cipher and forwards the ciphertext to the host device 24 over the link 28. Next, in the state 10, the host device 24 decrypts the ciphertext using the derived session key K according to the symmetric cipher to obtain clean data that may be further processed by the host device 24 (such as for display to a viewer or other operations).

The random number generators 220 and 222 in the host device 24 and POD module 26, respectively, are adapted to generate random numbers $M_H$ and t (in the host device 24) and $M_P$ and s (in the POD module 26). The random numbers may be truly random or pseudo-random numbers used to enhance security by providing randomized challenges between the host device 24 and the POD module 26. In one embodiment, the random number generator (RNG) used in each of the devices 24 and 26 employs an ElGamal encryption engine as a one-way function, although other techniques of generating random numbers are also contemplated. Inputs to the random number generator 220 or 226 include an RNG seed S ($S_P$ in the POD module 26 and $S_H$ in the host device 24), which may be a 160-bit string, a private key K, which may also be 160 bits in length (the private key is P in the POD module 26 and H in the host device 24), and a b-bit string c, in which $160<b<1024$. The bit stream c may be selected in such a way that any two consecutive values are different.

The output of the random number generator 220 or 222 is a string denoted by G(s,k,c), which in one embodiment may be a 1,024-bit string. In one embodiment, the random number generator 220 or 222 may generate random numbers as follows. Initially, a parameter u is defined that includes the 160 least significant bits of c:

$$u \leftarrow c_{lsb\text{-}160}.$$

Next, a message block X is created by padding the string c with zeros to obtain a 1,024-bit message block X:

$$X \leftarrow c \| 0^{1024-b}.$$

An exclusive OR operation is then performed on the RNG seed S and the parameter u to obtain a random number v:

$$v \leftarrow s \oplus u.$$

The ElGamal encryption step is then executed with message X, the random number v, and the private key K to obtain the message Y:

$$Y \leftarrow X(G^K)^y \bmod N.$$

The output G(s,K,c) is then set equal to the encrypted message Y, which is a random number.

The output G(s,K,c) is a 1,024-bit integer. In the authentication process according to some embodiments, the random number generated in the POD module 26 is the 160 least significant bits of the output $G(s,P,c)_{lsb-160}$, and the random number generated in the host device 24 is the 160 least significant bits of the output $G(s,H,c)_{lsb-160}$.

According to another embodiment, one-way hash functions may be utilized in the binding service among the head-end system 14, the host device 24, and POD module 26. One example of an one-way hash function algorithm is a secure hash algorithm (SHA) such as SHA-1.

Referring to FIG. 5, an entity authentication and key derivation process according to an embodiment to protect communications between the host device 24 and the POD module 26 uses a SHA-1 algorithm. The process is divided into three stages: an initialization stage (stage 1); an entity authentication and key derivation stage (stage 2); and a communications stage (stage 3) in which exchange of data between the POD module 26 and the host device 24 is protected by the derived session key.

A trusted third party 112 (FIG. 2) supplies a list of device identifiers and corresponding secret keys (e.g., 160-bit secret keys) and RNG seeds (e.g., 160-bit RNG seeds) for POD modules 26 and host devices 24 in the information transmission system. The secret keys are stored in various locations in the POD and host databases 104 and 106 that are addressable by POD device identifiers (P_IDs) and host device identifiers (H_IDs), respectively.

In this embodiment, the authorization field for the POD module 26 is represented as {P_ID||P||$S_P$}, which includes a concatenation of the POD module device identifier, secret key, and RNG seed, respectively. Similarly, the host device's authorization field is represented as {H_ID||H||$S_H$}. The secret keys P and H of the POD module 26 and host device 24 are stored in tamper-resistant storage elements 210 and 208, respectively.

During initialization, after the POD module 26 has been plugged into or otherwise operatively coupled to the host device 24, or after the host device 24 has been power cycled, the POD module 26 and host device 24 exchange newly generated random number integers $N_P$ and $N_H$ from the POD module 26 and host device 24, respectively. Each device then independently sets a common initial counter value $N_0$: $N_0 = N_P \oplus H$.

Next, after initialization in state 1, the host device 24 sets N equal to $N_0$ and then increments N by one (or some other predetermined value). The host device 24 then computes SHA-1(N⊕H), which is the secure hash function of N⊕H, and sends the following stream {H_ID||SHA-1(N⊕H)} to the POD module 26. In state 2, the POD module 26 also initializes N to $N_0$ and increments N by one (or some other value). The POD module 26 then computes the one-way hash function SHA-1(N⊕P). Next, the POD module 26 sends the following stream {P_ID||H_ID||N||SHA-1(N⊕H)||SHA-1(N⊕P)} to the head-end system 14. This indicates to the head-end system 14 that a binding service has been requested. In state 3, based on the received P_ID and H_ID values, the head-end controller 130 accesses storage locations 108 and 110 in databases 104 and 106, respectively, to retrieve the secret keys P and H of the POD module 26 and host device 24, respectively. After retrieving P and H, the head-end controller 130 computes SHA-1(N⊕P) and SHA-1(N⊕H), since P, H, and N are all known in the head-end system 14. The computed SHA-1 values are compared to the received SHA-1 values. If the values match, then the POD module 26 and host device 24 are identified by the head-end system 14 as trusted players.

In state 3, the head-end controller 130 then computes the following values which are sent in a binding stream back to the POD module 26: SHA-1[SHA-1(N⊕H)⊕P]; SHA-1[SHA-1 (N⊕P)⊕H]; SHA-1(H||N)⊕SHA-1(P); and SHA-1(P||N)⊕SHA-1(H). The former two terms are used for entity authentication and the latter two terms are used for shared key derivation. In state 4, the POD module 26 authenticates the host device 24 by computing the following hash function: SHA-1[SHA-1 (N⊕H)⊕P], from which SHA-1 (N⊕H) was received from the host device 24 and P is the secret key of the POD module 26. The derived value is compared to the hash function transmitted by the head-end system 14. If a match is determined, then the POD module 26 has authenticated the host device 24. Once authenticated, the POD module 26 derives the key k:

$$k = \text{SHA-1}(H\|N) \oplus \text{SHA-1}(P\|N).$$

In the above operation, the term SHA-1(P||N) is derived by taking the result SHA-1(H||N)⊕SHA-1(P) from the head-end system 14 and performing an exclusive OR operation of the result with the term SHA-1(P).

In turn, the POD module 26 forwards a stream including the following terms to the host device 24: SHA-1(N⊕P), SHA-1[SHA-1(N⊕P)⊕H], SHA-1(P||N)⊕SHA-1(H).

In state 5, upon receiving the binding stream from the POD module 26, the host device 24 computes the following term: SHA-1[SHA-1(N⊕P)⊕H], from which SHA-1 (N⊕P) was received from the POD module 26.

The result is compared to the same hash function forwarded by the POD module 26 (originally from the head-end system 14). If a match is found, then the host device 24 has authenticated the POD module 26, and the host device 24 derives the shared key k:

$$k = \text{SHA-1}(H\|N) \oplus \text{SHA-1}(P\|N).$$

In the above operation, the term SHA-1(P||N) is derived by performing an exclusive OR operation of the following received value SHA-1(P||N)⊕SHA-1(H) from the POD module 26 with the hash function SHA-1(H). The result of the exclusive OR operation is the value SHA-1(P||N).

Once entity authentication and the shared key derivation have been performed by the POD module 26 and the host device 24, the final shared session key K is calculated by each device by taking the key k under module of the target cipher key size:

$$K = k \bmod (\text{cipher key size}).$$

Using the shared session key K, the POD module 26 can cipher the content to be transmitted to the host device 24 over the link 28.

Thus, in state 6 of FIG. 5, the POD module 26 decrypts a data stream received from the head-end system that has been encrypted using a conditional access protocol. The POD module 26 then encrypts the clean content using the session key K according to a symmetric cipher and forwards the cipher content to the host device 24 over the link 28. In state 7, the host device 24 receives the cipher content and decrypts it to obtain a clean copy of the content for further processing by the host device 24.

The random number generator (RNG) 220 or 222 (in device 24 or 26) according to this embodiment may utilize SHA-1 as a one-way hash function. In this embodiment, the random number generation may be performed according to the random number generation specification described in the Federal Information Processing Standards (FIPS) Publication 186, dated May 19, 1994, and available at {http://www.itl.nist.gov}. The input to the RNG 220 or 222 may be a 160-bit RNG seed S ($S_P$ in the POD module 26 and $S_H$ in the host device 24) and a b-bit string c, in which 160<b<512. The output of the RNG 220 or 222 is a 160-bit string that is denoted as G(s,c).

According to another embodiment, entity authentication between the POD module 26 and the host device 24 is performed using a digital signature algorithm and a session key is derived according to a Diffie-Hellman key exchange scheme.

Referring to FIG. 6, a state diagram of an authentication and key exchange algorithm according to another embodiment is illustrated. The authorization field in the host device 24 for this embodiment may include {H_ID, $S_{H^{-1}}(H_{13}$ ID), H, $H^{-1}$}, where H_ID is the ID of the host device 24, $SH_{H^{-1}}$(H_ID) is the digital signature of H_ID created by the private key $H^{-1}$ of the host device 24, and H is the public key of the host device 24. The POD module 26 includes the following information in its authorization field: P_ID; $S_{P^{-1}}$(P_ID); $P^{-1}$ID; P.

Digital signature algorithms that may be used include the digital signature standard as described by the National Institute of Standards in Technology (NIST) in its Digital Signature Standard bulletin, dated January 1993. The Digital Signature Standard (DSS) is also known as the Federal Information Processing Standard (FIPS) 186. A variation of DSS is the elliptic version of DSS. Another digital signature algorithm that may be utilized is the Rivest-Shamir-Adleman (RSA) algorithm as described by RSA Data Security Inc. at their web site {http://www.rsa.com/rsalabs/}, dated in 1998.

To start the authentication process, the host device 24 sends portions of its authorization field {H_ID‖$S_{H^{-1}}$(H_ID)} to the POD module 26 in state 1. Next, in state 2, the POD module 26 sends portions of its authorization field {P_ID‖$S_{P^{-1}}$(P_ID)} as well as the authorization information of the host device 24 to the head-end system 14. In state 3, the head-end system 14 compares the received authorization field information, with data stored in databases 104 and 106. P_ID is used to retrieve information from location 108, which stores the public key P of the POD module 26 as well as its digital signature $S_{P^{-1}}$(P_ID). Similarly, H_ID retrieves information from location 110 in the database 106, which includes the public key H of the host device 24 as well as its digital signature $S_{H^{-1}}$(H_ID). Thus, in state 3, the head-end system 14 verifies that the received authorization field information is from authorized devices based on a comparison to the retrieved information from locations 108 and 110.

In state 4, once the head-end system 14 verifies that the devices 26 and 24 are valid devices, the head-end system 14 encrypts the public key P of the POD module 26 using a symmetric cipher scheme with the public key H of the host device 24 to derive $E_H$[P]. A possible symmetric cipher scheme may be a block cipher scheme, a stream cipher scheme, and others.

The head-end system 14 then sends $E_H$[P] back to the POD module 26. Upon receipt of $E_H$[P], the POD module 26 has implicitly authenticated the host device 24. To allow the host device 24 to authenticate the POD module 26, the POD module 26 sends the following stream {$E_H$[P]‖P_ID‖$S_{P^{-1}}$(P_ID)} to the host device 24 in state 5. This allows the host device to authenticate the POD module 26 by performing the operation $V_P$[P_ID‖$S_{P^{-1}}$(P_ID)] using the POD module's public key P. P is derived by the host 24 by decrypting $E_H$[P] with the host's key H. The operation $V_P$[ ] is performed by a verification engine in the host device 24 according to the digital signature algorithm.

After completion of entity authentication in states 1–5, the creation of a session key is started. In state 7, each of the POD module 26 and host device 24 generates their respective random integers x and y and computes $G^x$ mod N and $G^y$ mod N, respectively, where N is a common modulus and G is a common generator. The host device 24 sends $G^y$ mod N to the POD module 26, and similarly, the POD module 26 sends $G^x$ mod N to the host device 24. In state 8, the POD module 26 calculates a shared session key k: k=($G^y$ mod N)$^x$ mod N=$G^{yx}$ mod N. In state 8, the host device 24 takes the value received from the POD module 26 and computes the shared key k: k=($G^x$ mod N)$^y$ mod N=$G^{xy}$ mod N. The shared session key k is used by the POD module 26 and host device 24 to protect communications over the link 28. After the POD module 26 decrypts data received from the head-end system according to the payload cipher algorithm (e.g., a conditional access algorithm), the POD module 26 then encrypts the content using the session key k and forwards the cipher content to the host device 24, which decrypts the cipher content using its copy of the session key k.

Referring to FIG. 7, to further enhance security, several additional operations may be performed in addition to those described in connection with FIG. 6. In particular, the security level upgrading may be achieved by modifying states 4 and 7 in FIG. 6.

In FIG. 7, the upgraded security scheme includes operations that may be identical to those of FIG. 6 except for states 4 and 7. In state 4\* of FIG. 7, after receipt of authorization field information from the POD module 26 and the host device 24, the head-end system 14 generates both encrypted public keys: $E_H$[P] and $E_P$[H]. Both encrypted public keys are then transmitted back to the POD module 26, which extracts the public key H of the host device from $E_P$[H]. When the stream {$E_H$[P]‖P_ID ‖$S_{P^{-1}}$(P_ID)} is transmitted by the POD module 26 to the host device 24, the host device 24 can extract the public key P of the POD module 26 from $E_H$[P]. Since both the public and private keys of the devices 24 and 26 are well protected, a middle-man attack would be unlikely to break the system during the passing of the public keys to each other over secure channels.

State 7 is modified from that of FIG. 6 by breaking it into three states 7a, 7b, and 7c. In this embodiment, both the POD module 26 and the host device 24 generate a randomized challenge $x_n$ and $y_n$, as well as random integers x and y, which are used to derive the shared session key between the devices 26 and 24. In addition, in state 7a, the POD module 26 and host device 24 calculate $G^x$ mod N and $G^y$ mod N, respectively. The random numbers $x_n$ and $y_n$ are exchanged between the POD module 26 and host device 24. In state 7b, the POD module 26 generates its digital signature on the received challenge $y_n$ from the host device 24 by calculating a first phase Diffie-Hellman variable using the private key P of the POD module: $S_P^{-1}(y_n‖G^x$ mod N). Similarly, in state 7b, the host device 24 generates $S_H^{-1}(X_n‖G^y$ mod N). The respective digital signatures are exchanged between the POD module 26 and host device 24 along with $G^x$ mod N and $G^y$ mod N. Upon receipt in state 7c, each of the POD module 26 and host device 24 verifies the signature and extracts the first phase Diffie-Hellman variables. Successful verification results in the POD module 26 and host device 24 authenticating each other. Next, in state 8, the shared session key k is derived as in the embodiment of FIG. 6.

Some embodiments of the invention may have one or more of the following advantages. Vulnerability is localized such that compromise of one device does not result in system wide compromise. To achieve that end, according to some embodiments, local cryptographic variables are used and are chosen so as to not threaten the overall system in the event of compromise. In addition, a system according to some embodiments may be resistant to consumer-level attacks, which may include installation of circumvention devices or interface products. Connection of cables or devices outside the host device 24 does not result in compromise of the copy protection scheme implemented in the host device 24.

Another feature of a system according to some embodiments is that the conditional access system (in this case including the head-end system 14 and POD module 26) can restrict which host device a POD module can communicate with. The conditional access system is capable of identifying and disabling a suspicious host device, which is done in some embodiments by transmitting binding messages from the head-end system 14 only if the POD module 26 and the host device 24 have been verified by the head-end system 14 based on a comparison of values in one or more stored databases provided by a trusted third party.

The entity authentication and session key derivation process may be performed independent of the payload cipher algorithm, such as the conditional access algorithm. The authentication and key derivation process is relatively simple to implement in software executable on the host device 24 and POD module 26 with reduced involvement from hardware. In other embodiments, the authentication key derivation process may be implemented in hardware. In the CA-CP system according to some embodiments, the head-end system 14 is able to revoke authority of access to a host device in case of a break in the system. The copy protection scheme protects the exposed bus between the POD module and the host device and between the POD module and the head-end system.

Various software or firmware (formed of modules, routines, or other layers, for example), including applications and routines may be stored or otherwise tangibly embodied in one or more machine-readable storage media in the information transmission system. Storage media suitable for tangibly embodying software and firmware instructions may include different forms of memory including semiconductor memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as CD or DVD disks. The instructions stored in the one or more storage media when executed cause the information transmission system to perform programmed acts.

The software or firmware can be loaded into the information transmission system in one of many different ways. For example, instructions or other code segments stored on one or more storage media or transported through a network interface card, modem, or other interface mechanism may be loaded into the information transmission system and executed to perform programmed acts. In the loading or transport process, data signals that are embodied as carrier waves (transmitted over telephone lines, network lines, wireless links, cables and the like) may communicate the instructions or code segments to the information transmission system.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of providing secure communications in a system having a first and a second device, comprising:

communicating signatures of the first and second devices to an external system;

comparing signatures communicated by the first and second devices with corresponding signatures stored in the external system; and transmitting, from the external system, a predetermined message to at least one of the first and second devices if a match of the signatures is present.

2. The method of claim 1, wherein the communicating includes communicating digital signatures of the first and second devices.

3. The method of claim 1, further comprising authenticating the first and second devices based on the predetermined message.

4. The method of claim 1, further comprising creating the signatures according to a Digital Signature Algorithm.

5. The method of claim 1, further comprising deriving a session key in each of the first and second devices based on the predetermined message.

6. The method of claim 5, wherein the deriving includes using a key exchange cryptographic protocol.

7. The method of claim 6, wherein the deriving includes using a Diffie-Hellman cryptographic protocol.

8. The method of claim 5, further comprising generating a random number in each of the first and second devices in deriving the session key.

9. The method of claim 1, further comprising providing over a secure channel, from a trusted third party, the signatures of the first and second devices for storage in the external system.

10. A method of providing secure communications in a system including a transmitter and a receiver having a first and a second module, comprising:

receiving a request at the transmitter;

verifying identities of the first and second modules based on information in the request;

transmitting, from the transmitter, a predetermined message to the receiver after verification; and authenticating the first and second devices based on the predetermined message.

11. An apparatus capable of receiving content from a head-end system, comprising:

a receiver coupled to the transport medium and including a first device and a second device, the receiver containing signatures associated with the first and second devices that are communicable to the head-end system, the first and second devices adapted to receive a predetermined message from the head-end system and to authenticate each other based on the predetermined message.

12. The apparatus of claim 11, wherein the signatures are based on identifiers of first and second devices.

13. The apparatus of claim 12, wherein each of the first and second devices includes a storage element to store a private key, and wherein the signatures are based on the identifiers signed with private keys of the first and second devices.

14. The apparatus of claim 11, wherein the receiver includes a content protection system.

15. The apparatus of claim 1, wherein the first and second devices are adapted to derive a session key based on the predetermined message to protect information communicated between the first and second devices.

16. A system for transmitting content to a receiver having a first and second device comprising:

a storage device adapted to store verification information including signatures of the first and second devices in the receiver; and a controller adapted to receive a request including signatures of the first and second devices and to verify identities by comparing the signatures of the request to the signatures in the storage device, the controller adapted to further generate a message for transmission to the receiver if verification is successful.

17. An article including one or more machine-readable storage media containing instructions for protecting information communicated between a first and a second device in a system, the instructions when executed causing the system to:

receive digital signatures of first and second devices;

compare the received digital signatures with verification information in one or more storage elements; and transmit an authentication message if the comparison produces a match.

18. The article of claim 17, wherein the one or more storage media contain instructions that when executed causes the system to generate the authentication message by encrypting a public key of the first device with a public key of the second device.

19. The article of claim 18, wherein the one or more storage media contain instructions that when executed causes the system to generate the authentication message by encrypting the public key of the second device with the public key of the first device.

20. An article including one or more machine-readable storage media containing instructions for protecting information communicated between a first and a second device in a system, the instructions when executed causing the system to:

transmit signatures of the first and second devices to a third device;

receive an authentication message from the third device based on the signatures; and authenticate the first and second devices based on the authentication message.

21. The article of claim 20, wherein the one or more storage media contain instructions that when executed further causes the system to generate a session key in each of the first and second devices based on the authentication message.

22. The article of claim 21, wherein the one or more storage media contain instructions that when executed causes the system to generate the session key by using a key exchange cryptographic protocol.

23. The article of claim 22, wherein the one or more storage media contain instructions that when executed causes the system to generate the session key by generating a random number in each of the first and second devices.

24. The article of claim 22, wherein the one or more storage media contain instructions that when executed causes the system to generate the session key by exchanging randomized challenges between the first and second devices.

25. The article of claim 24, wherein the one or more storage media contain instructions that when executed causes the system to generate the session key by further creating and exchanging digital signatures of the randomized challenges between the first and second devices.

* * * * *

UNITED STATES PATENT AND TRADEMARK OFFICE
CERTIFICATE OF CORRECTION

PATENT NO.     : 6,516,414 B1
DATED          : February 4, 2003
INVENTOR(S)    : Minda Zhang and Richard J. Takahashi It is certified that error appears in the above-identified patent and that said Letters Patent is hereby corrected as shown below:

<u>Column 17,</u>
Line 3, "1" should be -- 11 --.

Signed and Sealed this

Nineteenth Day of August, 2003

JAMES E. ROGAN
*Director of the United States Patent and Trademark Office*